(12) United States Patent
Bishop et al.

(10) Patent No.: US 12,155,418 B2
(45) Date of Patent: Nov. 26, 2024

(54) NON-INTRUSIVE DESKEW OF TRUNKED CLIENTS IN AN OPTICAL NETWORK TRANSPORT SYSTEM

(71) Applicant: ADTRAN NETWORKS SE, Meiningen-Dreißigacker (DE)

(72) Inventors: Robert H. Bishop, Cumming, GA (US); Scott D. Orangio, Dacula, GA (US)

(73) Assignee: ADTRAN NETWORKS SE, Meiningen-Dreißigacker (DE)

( * ) Notice: Subject to any disclaimer, the term of this patent is extended or adjusted under 35 U.S.C. 154(b) by 202 days.

(21) Appl. No.: 18/081,323

(22) Filed: Dec. 14, 2022

(65) Prior Publication Data

US 2024/0204874 A1    Jun. 20, 2024

(51) Int. Cl.
*H04B 10/00*    (2013.01)
*H04B 10/27*    (2013.01)

(52) U.S. Cl.
CPC .................. *H04B 10/27* (2013.01)

(58) Field of Classification Search
CPC ......... H04B 10/27; H04L 25/14; H04J 3/1652
See application file for complete search history.

(56) References Cited

U.S. PATENT DOCUMENTS

| 10,932,018 B2 | 2/2021 | Bleck | |
| 2009/0247068 A1 | 10/2009 | Toyoda | |
| 2015/0106668 A1 | 4/2015 | Ran | |
| 2023/0077161 A1* | 3/2023 | Tsai | H04L 25/14 |
| 2024/0204874 A1* | 6/2024 | Bishop | H04J 3/1652 |

FOREIGN PATENT DOCUMENTS

EP    3739775 A1    11/2020

OTHER PUBLICATIONS

Toyoda, Hidehiro, 100GbE PHY and MAC Layer Implementations, IEEE Communications Magazine, Mar. 2010, pp. S41-S47, IEEE New York City, United States of America. (Document D1 in EESR listed as NPL_02).

(Continued)

*Primary Examiner* — Agustin Bello
(74) *Attorney, Agent, or Firm* — Kevin E Flynn; FLYNN IP LAW

(57) ABSTRACT

A process for removing skew across a set of at least two clients that are members of a particular trunk, the skew removed from a data path from a first communications system component to a second communications system component. The process using a deskew marker to initiate storage of a set of idle primitives in a FIFO for client member of the particular trunk. Releasing in lockstep, idle primitives for the set of FIFO for the set of client members of the particular trunk after receipt of the final deskew marker. Continuing to route subsequent data for the set of clients for that particular trunk through the set of FIFO for the set of clients for that particular trunk. The data path from the first communications system component to the second communications system component may include traversing a fiber optic network.

10 Claims, 4 Drawing Sheets

(56) References Cited

OTHER PUBLICATIONS

Andrade, Jesus Roldan, Extended European Search Report for application EP 23 21 6438 (in the same patent family as the '323 application), dated May 31, 2024 and received Jun. 3, 2024, 12 pages, European Patent Office, Munich Germany.

Irwin, Scott A. (Technical Editor), Multi-link Gearbox Implementation Agreement 3.0, Apr. 2016, 127 pages, Optical Internetworking Forum www.oiforum.com, Fremont California, United States of America (Document D2 in EESR listed as NPL_02).

Chalupa, C., Product Manual Fibre Channel Interface, Mar. 8, 2006, 222 pages, Seagate Technology LLC, Dublin, Ireland, (Document D6 in EESR listed as NPL_02).

Taborek, Rich, 8B10B Transmission Code as a Link Protocol Building Block, Mar. 12, 1996, 36 pages IEEE 802.3 HSSG Gigabit Ethernet reported retrieved on Apr. 5, 2024 from URL:https://www.ieee802.ort/3/z/public/presentations/mar1996/RT8B10B.pdf, IEEE, New York City, United States of America. (Document D7 in EESR in EESR listed as NPL_02).

\* cited by examiner

NON-INTRUSIVE DESKEW OF TRUNKED CLIENTS IN AN OPTICAL NETWORK TRANSPORT SYSTEM

BACKGROUND

Field of the Disclosure

This disclosure relates generally to optical transport networks. More specifically, the disclosure relates to a method for removing static differential delays (differential latency, static skew) for client paths ("clients") that are members of a single trunk.

The Problem

To create a higher bandwidth client signal, which then can be mapped and transported over an optical network, multiple individual clients can be trunked, or grouped, together. A requirement to allow this trunking capability is that each client belonging to the trunk group, once demapped, must have minimal skew in its data with respect to the other Clients' data in the same trunk group. Any skew introduced by preparing the data for transport over an optical network needs to be minimized to be within the tolerated skew limits for the client devices that connect to the endpoints.

Turning to FIG. 1, assume that there is a need for data to go from a set of client ports at a first endpoint 104 to a set of client ports a second endpoint 204. While FIG. 1 shows just two client ports per endpoint, this represents a set of at least two client ports. If second endpoint 204 is a significant distance from first endpoint 104, then the data may travel over a fiber optic network 190. To do so, first endpoint 104 provides data via a parallel client ports on transport device 120 which handles sending the data out over the fiber optic network 190. At the other end of the fiber optic network 190, another transport device 220 receives the data from the fiber optic network 190 and prepares the data for passing over parallel client ports to the second endpoint 204. As an example, the transport device 120 may be connected to the first endpoint 104 through a set of twelve 32 Gig connections and send that data out over one 400 Gig fiber optic network.

In this disclosure, it will be convenient to call transport device 120 the sending transport device 120 so that we can focus on components and actions that are unique to the sending side. Likewise, it will be convenient to call transport device 220 the receiving transport device 220 to focus on components and actions that are unique to the receiving side. Those of skill in the art will appreciate that in many instances transport devices 120 and 220 support bidirectional communication between endpoints 104 and 204. Thus, as a practical matter transport device 120 is both a sending transport device and a receiving transport device. Same for transport device 220.

Transport device 120 has a network portion 124 that uses a standard communication protocol to move data across the fiber optic network 190. The transport device 120 also has a clients portion 128 that handles the conversion of the data from the format used by the first endpoint 104 to the format used in the network portion 124. As the communication is normally bidirectional, the clients portion 128 also converts data from the format used in the fiber optic network 190 back into the format used by the first endpoint 104.

Transport device 220 has a network portion 224 and a clients portion 228 for the same purposes.

There are times when several clients are joined together in a group called a trunk to increase the bandwidth for a stream of data by forming a wider data pipe. When several clients are joined to form a trunk, it is important that the processing that occurs within the clients portion 128 of the transport device 120 and the clients portion 228 of the transport device 220 does not cause the data in the set of trunked clients to arrive at the second endpoint 204 with differences in arrival time is known as skew. Ideally, the data in the trunked set of clients arriving at second endpoint 204 should have no more skew than when the data in the trunked set of clients left first endpoint 104. The need to control skew is not just a soft preference, it is a hard requirement of the endpoints 104 and 204 which can only tolerate a small amount of skew across clients in a trunk. For example, some endpoints require less than 100 nanoseconds of skew across members of a trunk.

Vocabulary

Step.

The term step may be used in descriptions within this disclosure. For purposes of clarity, one distinct act or step may be discussed before beginning the discussion of another distinct act or step. The term step should not be interpreted as implying any particular order among or between various steps disclosed unless the specific order of individual steps is expressly indicated.

Substantially.

Frequently, when describing an industrial process it is useful to note that a given parameter is substantially met. Examples may be substantially parallel, substantially perpendicular, substantially uniform, and substantially flat. In this context, substantially X means that for purposes of this industrial process it is X. So something that may not be absolutely parallel but is for all practical purposes parallel, is substantially parallel. Likewise, mixed air that has substantially uniform temperature would have temperature deviations that were inconsequential for that industrial process.

As recognized in C. E. Equipment Co. v. United States, 13 U.S.P.Q.2d 1363, 1368 (Cl. Ct. 1989), the word "substantially" in patent claims gives rise to some definitional leeway—thus the word "substantially" may prevent avoidance of infringement by minor changes that do not affect the results sought to be accomplished.

Transport Level Primitives.

A service has a set of primitives. Particular primitives are used to access different operations such as sending a data-acknowledge, request to close a connection, request to reset a connection and so on. The set of primitives may include an IDLE primitive which can be used to indicate an operational port facility ready for frame transmission and reception. Another known Fiber Channel protocol transport primitive used in fiber channel interfaces is the Mark primitive (MRKtx). This primitive has a byte that is vendor unique. Thus, devices using this protocol will not expect a specific value in this byte.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Some aspects of the teachings of the present disclosure may be expressed as a process for removing skew across a set of at least two clients that are members of a particular trunk, the skew removed from a data path from a first communications system component to a second communications system component; the process comprising:

configuring the first communications system component and the second communications system component for participation in a deskew operation, including identifying the set of at least two clients that are members of the particular trunk;

sending a stream of idle primitives from the first communication system component to the second communication system component on the at least two clients that are members of the particular trunk;

at the first communication system component, trigger the deskew operation and send a deskew marker on the at least two clients that are members of the particular trunk;

at the second communication system component, for each client in the set of at least two clients that are members of the particular trunk, look for the deskew marker;

upon receipt of the deskew marker for a particular client, replace the deskew marker with a replacement idle primitive, place that replacement idle primitive and all subsequently received idle primitives for that particular client into a FIFO for that particular client;

note that the deskew marker has been received for that particular client;

after receipt of a final deskew marker needed to form a complete set of deskew markers, one for each client in the set of at least two clients that are members of the particular trunk—then begin clocked release from the set of FIFO for the set of at least two clients that are members of the particular trunk so that the replacement idle primitives are released in lockstep with at least some skew removed; and after beginning clocked release from the set of FIFO for the set of at least two clients that are members of the particular trunk, then stopping sending the stream of idle primitives from the first communication system component to the second communication system component on the at least two clients that are members of the particular trunk and then begin sending client data from the first communication system component to the second communication system component on the at least two clients that are members of the particular trunk wherein the client data for each client goes through the FIFO for that particular client.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
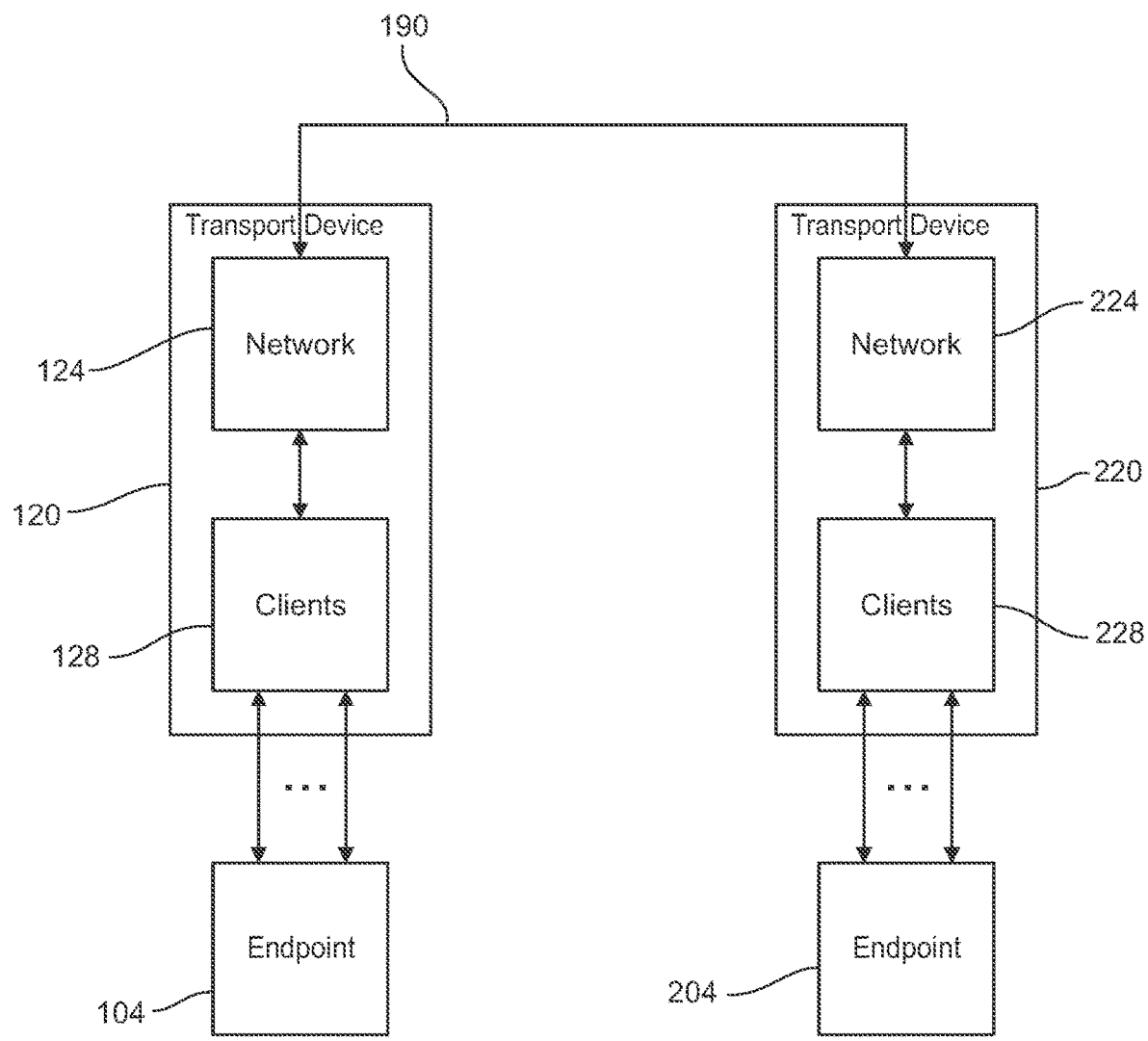
FIG. 1 is a basic representation of the path connecting endpoint 104 to endpoint 204.
Figure 2:
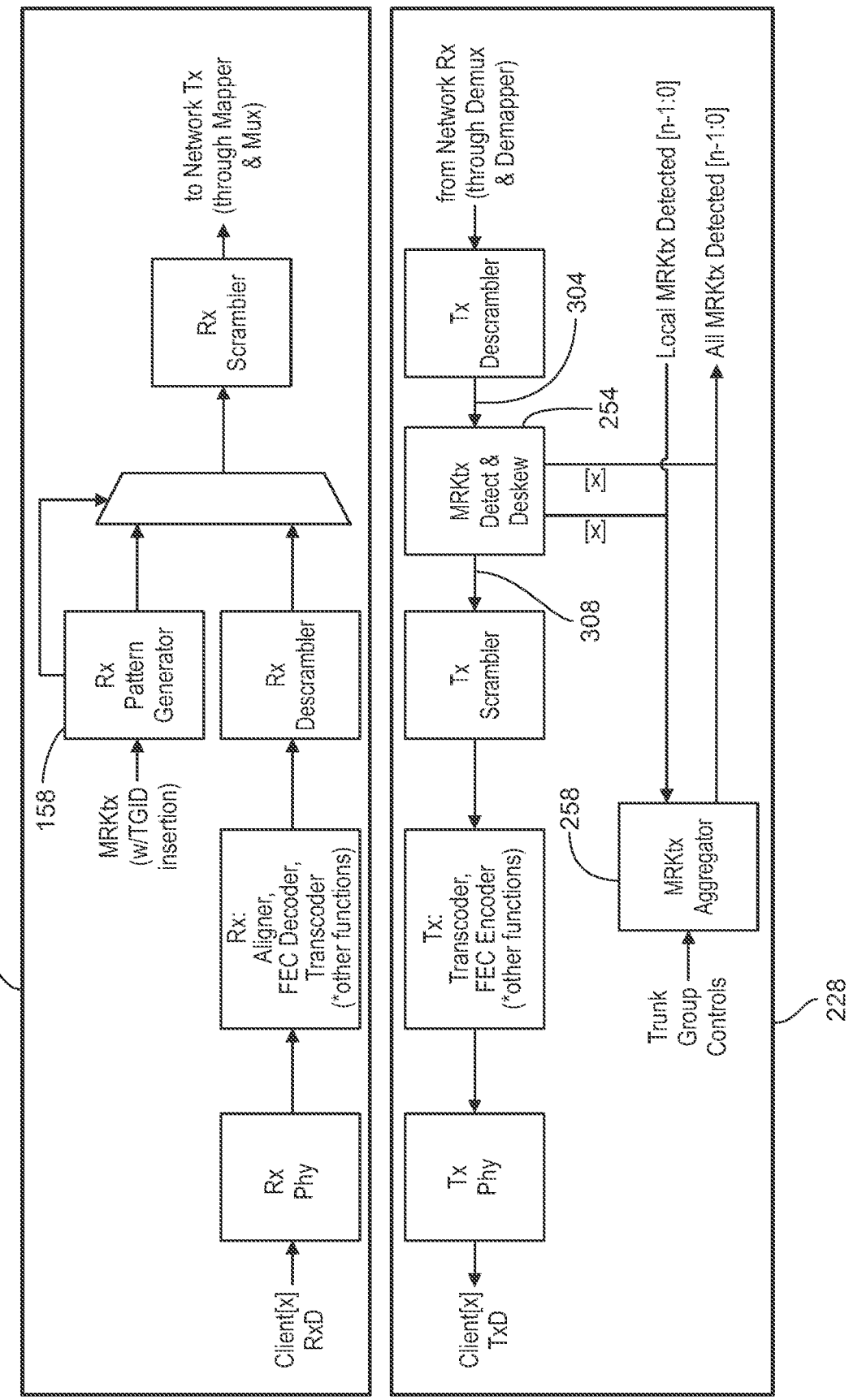
FIG. 2 shows additional detail to relevant components within the client portion 128 of transport device 120 and client portion 228 of transport device 220.

Looking at both FIG. 1 and FIG. 2, FIG. 2 shows additional detail to relevant components within the client portion 128 of transport device 120 and client portion 228 of transport device 220. For orientation, the left end would connect with endpoints 104 and 204 and the right end would connect with network portions 124 and 224.

A service has a set of primitives. Particular primitives are used to access different operations such as sending a data-acknowledge, request to close a connection, request to reset a connection and so on. The set of primitives may include an IDLE primitive which can be used to indicate an operational port facility ready for frame transmission and reception. Another known Fiber Channel protocol transport primitive used in fiber channel interfaces is the Mark primitive (MRKtx). This primitive has a byte that is vendor unique. Thus, devices using this protocol will not expect a specific value in this byte.

When the transport device 120 and transport device 220 are being configured, ports associated with a particular trump group are identified. In order to remove the skew that would otherwise exist across the ports in the trunk group when received at the second endpoint 204, a part of the configuration process is to trigger a deskew process. Once the deskew process is complete the data flow paths are adjusted to remove the static skew across members of the trunk group, and then the deskew process is turned off.

More specifically, when block 158 receives a request to deskew a set of clients within a defined trunk, then for each of the client data paths within the trunk, block 158 injects a MRKtx primitive that has been modified in the vendor byte to carry an ID value for the trunk. Both before and after creating and injecting the MRKtx primitive, the block 158 sends streams of IDLE primitives on each of the client data paths for the trunk. This MRKtx is sent atomically to all of the clients in the trunk group.

At client portion 228 of transport device 220, detect and deskew block 254 looks for incoming MRKtx primitives. With the receipt of MRKtx primitive for a particular client, three things happen. First the 66-bit MRKtx primitive is replaced with an IDLE which is also 66 bits long. Second, the replacement IDLE and the subsequent stream of IDLEs that are being created by block 158 are placed into a FIFO for that data client. Third, the receipt of the MRKtx primitive is reported to aggregator block 258.

When aggregator block 258 receives notice that the number of MRKtx primitives received on different data client members of the trunk equal the number of members of the trunk, the aggregator block 258 notifies the detect and deskew block 254 to simultaneously release the first IDLE from each of the FIFO for the clients that form the trunk. Subsequent sets of IDLE primitives are released in lockstep. The difference in the depths of the FIFO offsets the static skew that was originally present across clients within the trunk.

The deskew function may now be disabled. When the deskew is disabled, several things happen. Block 158 stops sending IDLE primitives and the data streams for the individual clients that are part of the trunk are transported across the fiber optic network 190 and routed into the FIFO within detect and deskew block 254. The differences in the FIFO depths offsets the skew in data arriving at the set of FIFO so that the data leaving the FIFO is substantially deskewed and thus within the skew tolerance for members of a trunk at endpoint 204.

As the MRKtx primitive is something that the network portion 124 of the transport device 120 may inject as part of normal operations, when the deskew operation is disabled, the detect and deskew block 254 stops looking for MRKtx primitives.

Figure 3:
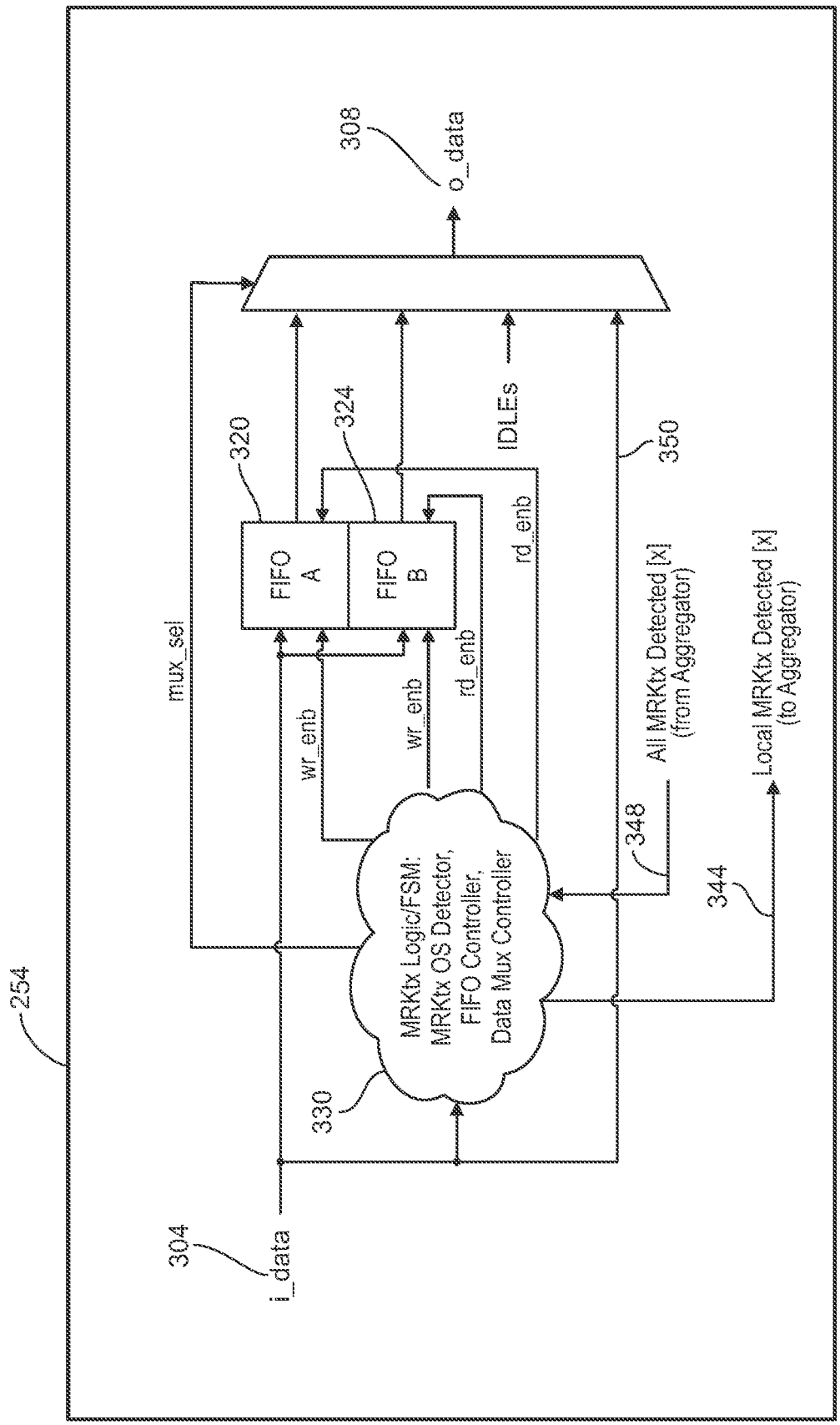
FIG. 3 conveys additional detail about the operation of the detect and deskew block 254 as an incoming data stream 304 (including primitives injected at block 158 (FIG. 2)) passes through the detect and deskew block 254 to exit as outgoing data stream 308.

FIG. 3 conveys additional detail about the operation of the detect and deskew block 254 as an incoming data stream 304 (including primitives injected at block 158 (FIG. 2)) passes through the detect and deskew block 254 to exit as outgoing data stream 308. The logic 330 within the detect and deskew block 254 works with the aggregator block 258 (FIG. 2). During configuration of transport device 220 (FIG. 1), a deskew operation for a set of data clients that are identified as part of a trunk can be started. For each data client, there is at least one FIFO 320. As discussed below, having a second FIFO 324 is useful if there may be an additional deskew operation at a later time while there is data in the first FIFO 320.

The incoming data stream 304 for each of the data clients that are part of the trunk will start with IDLE primitives and then include a MRKtx primitive. This MRKtx primitive will be removed and replaced with an IDLE which will be routed to the first FIFO 320. The receipt of the MRKtx primitive will be noted by logic 330 and an indication 344 of receipt will be sent to aggregator block 258. Aggregator block 258 keeps track of whether a MRKtx primitive has been received for each of the clients that have been identified as part of a specific trunk. Aggregator block 258 will send a signal 348 back to the logic 330 when a full set of MRKtx primitives have been received for that specific trunk.

When logic 330 receives the signal 348 from the aggregator block 258 that the number of MRKtx primitives received equals the number of trunk members, logic 330 causes each FIFO 320 that is part of the trunk group to begin releasing stored IDLE primitives in lockstep.

Once transport device 120 (FIG. 1) is set to end the deskew operation, block 158 will stop providing the IDLE primitives used in the deskew operation and client data will be transported and routed into the set of FIFO 320 which will offset the static skew and release data from the trunked clients in lockstep.

One of skill in the art will appreciate that the clients that are not part of any trunk group will have incoming data stream 304 bypass 350 the FIFO 320 and pass out at outgoing data stream 308.

As noted above, a second FIFO 324 is useful if there may be an additional deskew operation at a later time while there is data in the first FIFO 320. For the deskew operation to work, the set of FIFO used for the clients in the trunk group must all start out empty. Simply dropping the existing contents of the first set of FIFOs is unacceptable as dropping data is not acceptable. As there is two sets of FIFOs (320 and 324), the first set of FIFOs could be used on the next deskew operation.

Figure 4:
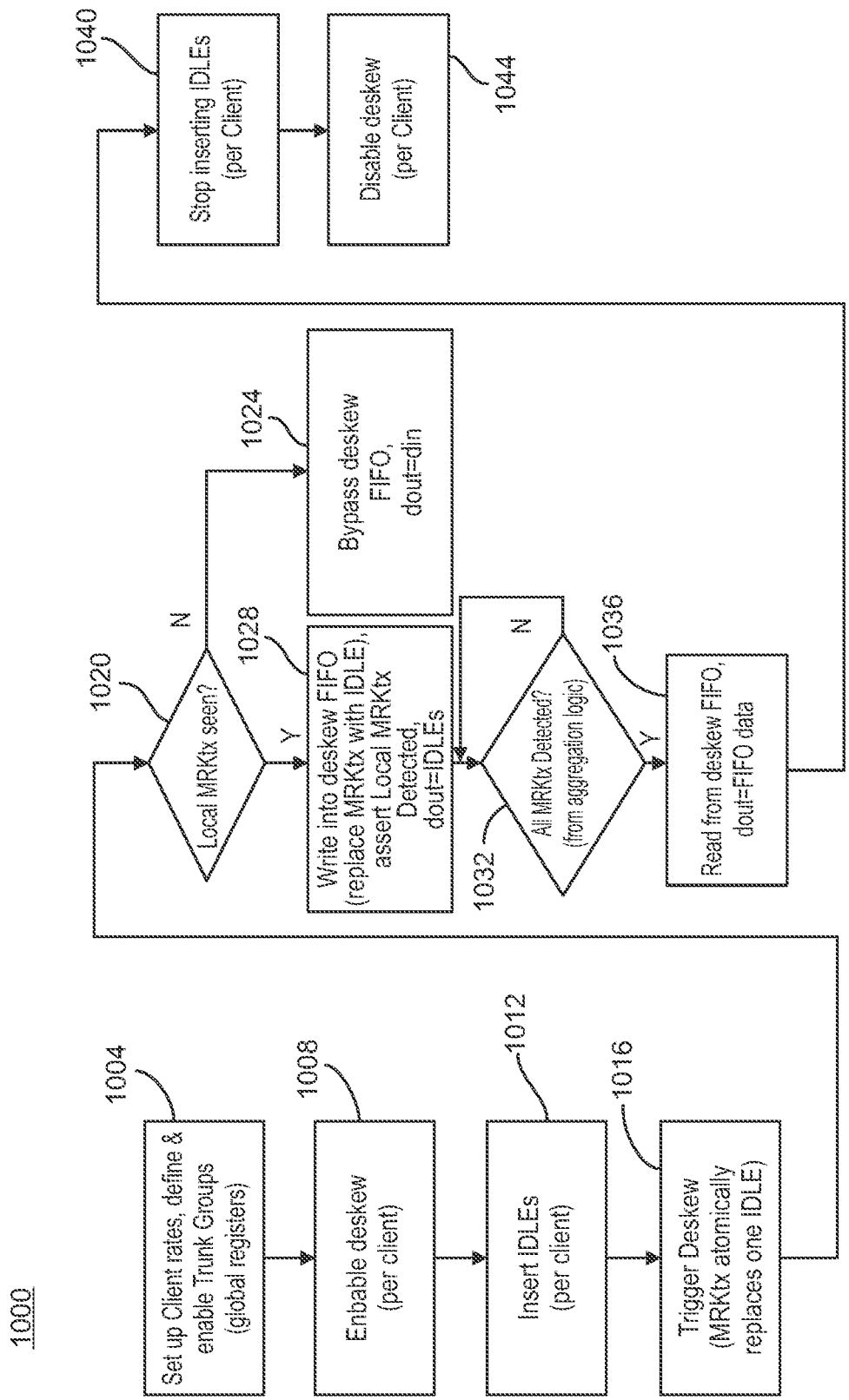
FIG. 4 is a flowchart the reiterates the steps for the deskew process 1000.

FIG. 4 is a flowchart the reiterates the steps for the deskew process 1000.

Step 1004—Configure transport devices 120 and 220 for participation in the deskew operation. The members of the trunk group will need to be identified.

Step 1008—Enable deskew. The logic 330 for each detect and deskew block 254 in the receiving transport device 220 will be prepared to route incoming data stream 304 to the first FIFO-320 for the clients in the trunk group upon receipt of the MRKtx primitive.

Step 1012—Start streams of IDLE primitives for each client that is part of the trunk. This happens in the sending transport device 120 (FIG. 1).

Step 1016—Trigger deskew. Each block 158 associated with a client that is part of a trunk will create and send a MRKtx primitive. The M2 byte in the MRKtx primitive is normally used to convey a vendor ID, this byte is used in this operation to identify a trunk group ID. The MRKtx primitive may be substituted for an IDLE primitive.

Branch 1020—Logic 330 (FIG. 3) is looking for the MRKtx primitive for each client on the receiving transport device 220 (FIG. 1). Before the receipt of the MRKtx primitive go to step 1024. After the receipt of the first MRKtx primitive, go to step 1028.

Step 1024—the stream of IDLE primitives are routed around the FIFO 320 so that the incoming data stream 304 (FIG. 3) becomes the outgoing data stream 308 (FIG. 3).

Step 1028—the MRKtx primitive is replaced with an IDLE primitive and this IDLE primitive becomes the first item into the FIFO 320 for that client. Note that for other clients, they may still be awaiting the first MRKtx primitive and the data stream is continuing to bypass the FIFO 320.

Branch 1032—Once the MRKtx primitive has been detected for each of the clients in the set of n clients that form the trunk, then go to step 1036.

Step 1036—start releasing data from the set of FIFOs 320 for the set of clients that form the trunk. The first set of released data will be the n IDLE primitives that replaced the n MRKtx primitives. The data for the n clients is now deskewed. As the source of skew is static, the data will remain deskewed. Incoming data streams 304 for the n clients that are part of the trunk continue to be routed through the FIFOs 320 to maintain the deskew correction.

Step 1040—Stop sending IDLE primitives at block 158 within outgoing transport device 120 for each of the n clients that are part of the trunk.

Step 1044—Disable the deskew function within logic 330 for each of the n clients on the receiving transport device 220 so that a MRKtx primitive sent by the network portion 124 (FIG. 1) of sending transport device 120 (FIG. 1) does not impact detect and deskew block 254 (FIG. 3) of the receiving transport device 220.

Amount of Skew Removed.

Those of skill in the art will appreciate that it may be hard to say with certainty that 100.00% of skew is removed by any particular process as it is not possible to measure skew to an infinite number of significant figures. One can say that after skew removal, that the skew that remains is within the allowable tolerance for downstream components. For example, it can be known that the skew after the deskew process is less than the tolerable 100 nanoseconds of skew for members of a trunk. To put the 100 nanoseconds skew limit in context, it may be useful to know that in one implementation of the teachings of the current disclosure, the FIFO units were sized to handle 2.4 microseconds of data which would be 2400 nanoseconds. Thus the size of the FIFO is 24× the size of the maximum tolerable skew limit. While this size was purposefully chosen to be ample, one can discern that the ratio of initial skew to tolerable skew may be on the order of 10× to 20×.

ALTERNATIVES AND VARIATIONS

Where the Deskew Happens

The present disclosure teaches a process for deskew. In order to provide a concrete example of the use of the deskew process, the present disclosure placed the various functionality required for this process in transport devices 120 and 220. One of skill in the art will recognize that the same functionality may be implemented within endpoints 104 and 204. Often the transport devices are provided by one vendor and the endpoints may be provided by a different vendor. Either vendor has the option of implementing the teachings of this disclosure within equipment sold by that vendor. Note that by running the deskew from one endpoint to the other endpoint, additional sources of static skew can be removed from the.

One of skill in the art will appreciate that transport device 220 may need to be adjusted to allow MRKtx primitives to pass from endpoint 104 to endpoint 204 rather than get discarded at transport device 220.

Use of Modified Primitives

While a preferred embodiment uses a primitive with a user modifiable field, one of skill in the art could employ the teachings of the present disclosure using a frame that is recognized by the receiving transport device 220 to trigger the deskew function. This frame could carry identification of the relevant trunk. If the deskew process is placed within the endpoints 104 and 204, then the deskew function could rely on a modified packet that contains the trunk ID and is used for the same purposes as the MRKtx primitive.

Removal of Primitive After Release From FIFO.

The disclosure shows the FIFO receive an IDLE instead of the primitive. One of skill in the art can recognize that the goal of avoiding the chance that a primitive used for this deskew process could adversely endpoint 204 could also be achieved by placing the received primitives in the relevant FIFO 320 and then replacing the primitive with an IDLE after the concurrent release of the four primitives from the FIFO 320.

Other That Optical Transport Network (OTN).

While a use of the teachings of this disclosure has been developed for use with transport devices connected to a fiber optic network 190 using Fiber Channel protocol, that is not a requirement in order to obtain the benefits of the teachings of this disclosure. The teachings may be used with other networking systems that have static skew. The teachings of this disclosure may be used in a system that has both static skew which would be removed by the teachings of this disclosure and one or more additional systems that address dynamic skew using techniques known to those of skill in the art.

FIFO.

Those of skill in the art will appreciate that first in first out function in a FIFO could be implemented a number of different ways. A FIFO register is but one of the many ways of adding this functionality and the teachings of the present disclosure do not require a specific type of FIFO implementation.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A process for removing skew across at least two client paths that are members of a particular trunk, the skew removed from a data path (190) from a first communications system component (120) to a second communications system component (220); the first communications system component conveying the at least two client paths to the second communications system component, the process comprising the steps of:

sending a stream of IDLE primitives from the first communication system component to the second communication system component on the at least two client paths;

at the first communication system component, sending a predefined deskew marker, different from the IDLE primitive, on the at least two client paths;

at the second communication system component, for each client on the at least two client paths, looking for receipt of the deskew marker;

upon receipt of the deskew marker for a particular client path of the at least two client paths;

replacing the deskew marker with an IDLE primitive;

placing that IDLE primitive and all subsequently received IDLE primitives for that particular client path into a FIFO (320) for that particular client path; and noting that the deskew marker has been received for that particular client path;

when the deskew marker has been received for each client path of the at least two client paths;

beginning clocked release from the FIFOs for the at least two client paths;

after beginning clocked release, stopping sending the stream of IDLE primitives from the first communication system component to the second communication system component on the at least two client paths and then beginning sending client data from the first communication system component to the second communication system component on the at least two client paths wherein the client data for each client path goes through the FIFO for that particular client path.

2. The process of claim 1 wherein after removal of at least some skew, any remaining skew for the at least two client paths is less than 100 nanoseconds across members of the particular trunk.

3. The process of claim 1 wherein data travels from a first endpoint (104) through a first transport device (120) to a second transport device (220) to a second endpoint (204); and the first communication system component is the first transport device and the second communication system component is the second transport device.

4. The process of claim 1 wherein data travels from a first endpoint through a first transport device to a second transport device to a second endpoint; and the first communication system component is the first endpoint and the second communication system component is the second endpoint.

5. The process of claim 1 wherein the deskew marker is a MRKtx primitive.

6. The process of claim 5 wherein the MRKtx primitive contains identification of a trunk ID as more than one trunk can exist between the first communication system component and the second communication system component.

7. The process of claim 1 wherein the deskew marker is a frame that the second communication system component recognizes as the deskew marker.

8. The process of claim 1 wherein the deskew marker is a packet that the second communication system component recognizes as the deskew marker.

9. The process of claim 1 further comprising notifying the second communications system component to stop looking for the deskew marker.

10. The process of claim 1 wherein the data path from the first communications system component to the second communications system component includes traversing a fiber optic network.

* * * * *